United States Patent [19]

Otomo et al.

[11] Patent Number: 4,766,039

[45] Date of Patent: Aug. 23, 1988

[54] MAGNETIC HEAD MADE FROM AMORPHOUS MAGNETIC FILM

[75] Inventors: Shigekazu Otomo, Sayama; Noriyuki Kumasaka, Ome; Noritoshi Saito, Hachioji; Takeo Yamashita, Tachikawa; Kazuo Shiiki, Kanagawa; Yoshihiro Hamakawa, Kokubunji, all of Japan

[73] Assignee: Hitachi, Ltd., Tokyo, Japan

[21] Appl. No.: 875,222

[22] Filed: Jun. 17, 1986

[30] Foreign Application Priority Data

Jun. 21, 1985 [JP] Japan .................... 60-134143

[51] Int. Cl.$^4$ .................................... G11B 5/31
[52] U.S. Cl. .................... 428/469; 360/125; 360/126; 428/900
[58] Field of Search ................ 148/309, 304; 252/62.55; 360/125, 126; 420/424, 425, 426, 427, 428, 429, 430, 435, 436, 439, 440; 428/670, 672, 673, 694, 900, 928, 469

[56] References Cited

U.S. PATENT DOCUMENTS

| | | | |
|---|---|---|---|
| 4,056,411 | 11/1977 | Chen et al. | 148/121 |
| 4,411,716 | 10/1983 | Shiiki et al. | 148/304 |
| 4,416,709 | 11/1983 | Ohya et al. | 148/403 |
| 4,488,195 | 12/1984 | Yanagiuchi et al. | 360/125 |
| 4,608,297 | 8/1986 | Shimada et al. | 428/215 |
| 4,619,720 | 10/1986 | Sakai et al. | 420/403 |
| 4,623,387 | 11/1986 | Masumoto et al. | 420/41 |
| 4,657,604 | 4/1987 | Ogasawara et al. | 148/304 |
| 4,668,310 | 5/1987 | Kudo et al. | 420/436 |
| 4,671,828 | 6/1987 | Yamauchi et al. | 148/309 |

FOREIGN PATENT DOCUMENTS

| | | |
|---|---|---|
| 0061290 | 9/1982 | European Pat. Off. |
| 0081239 | 6/1983 | European Pat. Off. |
| 0086485 | 8/1983 | European Pat. Off. |
| 0144150 | 6/1985 | European Pat. Off. |
| 3306327 | 9/1983 | Fed. Rep. of Germany |
| 202511 | 10/1985 | Japan |

*Primary Examiner*—George F. Lesmes
*Assistant Examiner*—William M. Atkinson
*Attorney, Agent, or Firm*—Antonelli, Terry & Wands

[57] ABSTRACT

A magnetic head comprising a magnetic film in at least a part of a magnetic circuit, at least a part of the magnetic film being formed in contact with, or being exposed to, an oxide or oxygen at least in a heating step at 150° C. or higher in a process for preparing the magnetic head is disclosed. An amorphous alloy film for the magnetic film has the following composition formula to give distinguished head characteristics without any oxidation:

$$Co_a T_b Zr_c N_d$$

where T is at last one of Nb, Ta, W, Mo, V and Cr; N is at least one of Au, Pt and Ag; $d \geq 1$, $b > 0$, $b_1 + b_2 + 2c \geq 10$, $a + d \geq 80$, $-1 \leq (3c - b_1 - 3b_2 - 5b_3 - 3b_4 - 4d)/(c + b_1 + b_2 + b_3 + b_4 + d) \leq 1$, and $a + b + c + d = 100$, where $b_1$ is a Nb concentration, $b_2$ is a Ta concentration, $b_3$ is a W concentration, $b_4$ is sum total of Mo, Cr and V concentrations and $b = b_1 + b_2 + b_3 + b_4$.

19 Claims, 5 Drawing Sheets

MAGNETIC HEAD MADE FROM AMORPHOUS MAGNETIC FILM

BACKGROUND OF THE INVENTION

This invention relates to a magnetic head suitable for high density magnetic recording, and particularly to a magnetic head using an amorphous magnetic alloy film having such distinguished characteristics as a high saturation flux density, a high crystallization temperature, a low magnetostriction constant and a high oxidation resistance.

As a result of recent remarkable progress of higher density and higher performance magnetic recording, higher coercive force tapes have been employed in the field of VTR (video tape recorders) to improve the recording density, and a need for magnetic heads using a magnetic material having a higher saturation flux density and a higher property has been increasing. Furthermore, as a result of higher density recording in the field of thin film heads for computer disks, there has been a need for making thin film magnetic poles to improve the resolution. However, magnetic saturation is liable to take place at the tip end of the thin magnetic pole, and thus there has been a need for a thin film magnetic head using a higher saturation flux density and higher performance magnetic film. Still furthermore, in the field of single pole type head for perpendicular magnetic recording now under extensive research, there has been a need for making the thickness of main magnetic pole extremely thin to improve the recording density. Thus, magnetic saturation is likewise liable to take place at the tip end of the magnetic pole, and consequently there has been a need for a single pole type head for a perpendicular magnetic head using a magnetic film having a higher saturation flux density and a higher performance to solve this problem. Still furthermore in the field of magnetoresistive heads for computer magnetic tape memory units, etc., there has been a need for a higher performance magnetic film as a shield thin film for such heads.

As a magnetic film for these magnetic heads, Ni-Fe based alloy films (permalloy films) have been so far mainly used, but recently sputtered amorphous films are now under development as magnetic films having a higher saturation flux density and a higher performance. Among them, particularly an amorphous alloy containing Zr as the main glass-forming element has a better heat resistance and a better corrosion resistance than amorphous alloys containing metalloid elements such as B, Si, P, etc. as the main glassforming element, and thus has distinguished characteristics for a magnetic film for the magnetic head. The Zr-based amorphous alloy can be specifically represented by such a composition formula as $M_aT_bZr_c$, where M is at least one of Co, Fe, Ni, etc. having a magnetic moment, and T is other transition metal element than M and Zr. The amorphous alloys containing Zr as the main glass-forming element are disclosed in Japanese Patent Application Kokai (Laid-open) No. 55-138049, Japanese Patent Application Kokai (Laid-open) No. 56-84439, etc. Among the Zr-based amorphous alloys, the Co-Zr based amorphous alloy, i.e., where M is Co, is a good magnetic material having a high magnetic flux density, but has a relatively high magnetostriction constant such as $2-4\times10^{-6}$. By using such elements as V, Nb, T, Cr, Mo, W, etc. making a negative contribution to the magnetostriction coefficient of the amorphous alloy as the additive element T, amorphous alloys having a substantially zero magnetostriction constant can be obtained. Among the additive elements T, Nb and Ta have a relatively high ability to form an amorphous state, and thus amorphous alloy containing these element species has a broader range for the amorphous composition. That is, a high saturation flux density can be obtained therefrom.

As described above, the amorphous alloy represented by the composition formula $M_aT_bZr_c$ has a high saturation flux density, distinguished corrosion resistance and thermal stability, and a substantially zero magnetostriction constant, and thus can serve as quite a suitable amorphous alloy film for the magnetic head. However, there are still the following problems in its application to the magnetic head. That is, the essential element for forming an amorphous state in the said amorphous alloy, i.e. Zr, is readily susceptible to oxidation. The value of the free energy change resulting from formation of an oxide of Co, the main component of the amorphous alloy, amounts to $-43$ to $-47$ Kcal per atomic weight of Co at 500° C., whereas that of Zr is $-230$ Kcal, i.e. a very negative value. The more negative the value of free energy change of an element, the more oxidizable the element. Furthermore, the additional element T for the magnetostriction adjustment is generally more oxidizable than Co. For example, the value of free energy change of V is $-145$ Kcal, that of Nb is $-188$ Kcal, that of Ta is $-186$ Kcal, that of Cr is $-112$ Kcal, that of Mo is $-134$ Kcal, and that of W is $-105$ Kcal. In the amorphous alloy represented by the composition formula $M_aT_bZr_c$, the elements shown by T and Zr are so oxidizable that amorphous alloys comprising these elements are readily oxidizable. Even if thin films are prepared from these amorphous alloys either in vacuum or in an inert gas atmosphere according to a splat cooling method, the alloys are readily oxidizable by oxygen in the atmosphere, or react with a nozzle material composed of oxides to cause nozzle clogging. That is, the Zr-containing amorphous alloys are suitable for preparing films in high vacuum or a high purity inert gas atmosphere according to a sputtering method, etc.

The Zr-containing amorphous alloy films can be prepared by a thin film-forming technique such as sputtering, etc., but there are still the following problems in their application to a magnetic head. A process for preparing a magnetic head where a magnetic film is used in a magnetic circuit generally includes a heating step at an elevated temperature, for example, 150° C. at the lowest and about 500° C. at the highest. In the heating step, the Zr-containing amorphous alloy film undergoes surface oxidation, resulting in deterioration of the magnetic characteristics. Furthermore, these amorphous alloy films are often formed on a substrate of glass or oxides such as $SiO_2$, ferrite, etc., or through contact with glass, oxides such as $SiO_2$, ferrite, etc., or oxygen-containing organic materials such as resin, etc. on these amorphous alloy films. Thus, the Zr-containing amorphous alloys react with these oxides or oxygen in the resin to deteriorate the magnetic characteristics of the amorphous alloy films. The problems are remarkable particularly in the case of small film thickness, for example, in the case of a single pole type head for a perpendicular magnetic head using a magnetic film having a thickness of about 0.2 μm as the main magnetic pole film, or a thin film magnetic head using a magnetic film having a thickness of about 1 μm as a magnetic pole, or a magnetoresistive head using a thin film magnetic film as a magnetic shield film. Also in the VTR magnetic head using a magnetic head having a thickness of about 10 μm, reaction takes place at the interface between the magnetic film and the glass or the oxide, and erosion of the magnetic film, deterioration of the magnetic characteristics, etc. occur. Thus, there still are the problems of deterioration of the magnetic head characteristics.

SUMMARY OF THE INVENTION

An object of the present invention is to solve the abovementioned problems and provide a magnetic head having distinguished head characteristics without oxidation of an amorphous alloy film as applied to a magnetic circuit in a heating step in a process for preparing a magnetic head.

The foregoing object of the present invention can be attained by a magnetic head using an amorphous alloy film being represented by the composition formula $M_a T_b Zr_c$ and further containing at least one element of Au, Ag and Pt as a magnetic film for a magnetic circuit. As already described, Zr and V, Nb, Ta, Cr, Mo and W shown by T to be used in the present amorphous alloy are readily oxidizable elements owing to their negative and very large free energies in formation of oxides, whereas Ru, Rh, Pd, Os, Ir and Pt of group VIII of the Periodic Table and Ag and Au of group Ib thereof have negative and small or positive free energies in formation of oxides, and thus are sparingly oxidizable elements. Their free energies per atomic weight in formation of oxides are as follows: Ru $-24.8$ Kcal; Rh $-7.8$ Kcal; Pd $-3$ Kcal; Os $-9.4$ Kcal; Pt $+7$ Kcal; Ag $+2.3$ Kcal; and Au $+24$ Kcal. The positive free energy in formation of oxides means no formation of oxide even by heating (500° C.), and thus particularly Pt, Au and Ag are distinguished elements capable of improving the oxidation resistance. When non-magnetic elements of Zr, V, Nb, Ta, Mo, W, etc. are added to amorphous alloys, generally the saturation flux density rapidly decreases with increasing amount of the non-magnetic elements. On the other hand, when Pt, Au and Ag are added thereto, the saturation flux density is less decreased, but the crystallization temperature can be effectively increased, as compared with the alloys having an equal saturation flux density. Furthermore, these additional elements have a negative contribution to the magnetostriction constant of an amorphous alloy film. Thus, the amount of elements shown by T to be added to make the magnetostriction zero in a Co-Zr based amorphous alloy can be made smaller thereby. That is, an amorphous alloy having a substantially zero magnetostriction constant can be obtained according to the present invention while maintaining the characteristics of Co-Zr based amorphous alloys, i.e., a high crystallization temperature and a high saturation flux density.

The amorphous alloy for a magnetic head according to the present invention can be basically represented by composition formula $Co_a T_b Zr_c N_d$, where N is at least one noble metal element of Au, Pt and Ag; the sum total of a and d shows that the amorphous alloy has a ferromagnetic property and must be at least 80% by atom to have a saturation flux density of at least about 8 KG and not more than 95% by atom to make the film amorphous; d must be at least 1% by atom, preferably at least 3% by atom, to give an oxidation resistance as aimed at in the present invention to the film; and values of b, c, and d must satisfy the following formula to make the absolute value of the magnetostriction constant not more than about $1 \times 10^{-6}$, i.e., substantially zero:

$$-1 \leq (3c - b_1 - 3b_2 - 5b_3 - 3b_4 - 4d)/(c + b_1 + b_2 + b_3 + b_4 + d) \leq 1$$

where $b_1$ is a concentration of Nb, $b_2$ a concentration of Ta, $b_3$ a concentration of W, $b_4$ the sum total of concentrations of Mo, Cr and V and $b = b_1 + b_2 + b_3 + b_4$. Furthermore, b and c must satisfy the following relationship to make the film amorphous:

$$b_1 + b_2 + 2c \geq 10$$

DETAILED DESCRIPTION OF THE PREFERRED EMBODIMENTS

The present invention will be described in detail below, referring to the examples and the accompanying drawings.

EXAMPLE 1

Amorphous alloy films having a thickness of 0.2 μm and compositions of $Co_{84}Nb_{13}Zr_3$ (% by atom) and $Co_{82}Nb_6Au_4Zr_8$ (% by atom), respectively, were formed on glass substrates (#7059, trademark of a product made by Corning Inc, USA) by means of a rf diode sputtering apparatus. The magnetic properties of the films are shown in Table 1.

TABLE 1

| | | Comparative Example | The Invention |
|---|---|---|---|
| Composition | | $Co_{84}Nb_{13}Zr_3$ | $Co_{82}Nb_6Au_4Zr_8$ |
| Bs (KG) | | 9.5 | 10.3 |
| λs | | $-0.3 \times 10^{-6}$ | $+0.1 \times 10^{-6}$ |
| Tx (°C.) | | 520 | 525 |
| Hc (Oe) | as sputtered | 0.5 | 0.5 |
| | as annealed at 350° C. 2 hrs | 3.0 | 0.8 |

As shown in Table 1, the amorphous alloy film having the composition $Co_{82}Nb_6Au_4Zr_8$ of the present alloy had a Bs larger by 0.8 KG, a substantially equal Tx and a much smaller magnetostriction constant, i.e., $0.1 \times 10^{-6}$ smaller than the amorphous alloy film having the composition $Co_{84}Nb_{13}Zr_3$ according to the comparative example. These films had equal Hc after sputtering, but the $Co_{84}Nb_{13}Zr_3$ film had a considerably increased Hc after annealing in an Ar gas stream at 350° C. for 2 hours, whereas the present amorphous alloy film containing Au had a less increased Hc.

Figure 1:
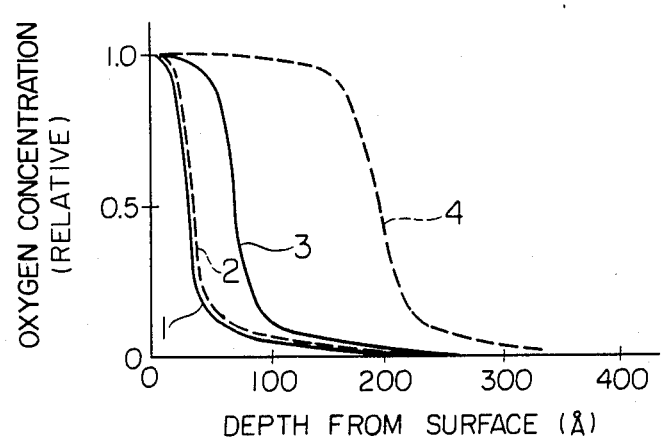
FIG. 1 is a characteristic diagram showing a relationship between the depth from the surface of amorphous alloy films and the oxygen concentration.

The thickness of the oxide film on the surfaces of these amorphous alloy films were measured by Auger electron spectroscopy. The results are shown in FIG. 1, where curves 1 and 3 show changes in oxygen concentration by the depth from the film surface of the present $Co_{82}Nb_6Au_4Zr_8$ amorphous alloy film and curves 2 and 4 show those of the $Co_{84}Nb_{13}Zr_3$ amorphous alloy film of the comparative example. Curves 1 and 2 show the results after sputtering, and curves 3 and 4 thoses after annealing in the Ar gas stream at 350° C. for 2 hours.

As shown in FIG. 1, the films after the sputtering had surface oxide films having a thickness of about 40 Å in the present alloy film as well as in the comparative example alloy film, whereas, after the annealing at 350° C. for 2 hours, the oxide film of the comparative example amorphous alloy film had a thickness increased to about 200 Å, whereas that of the present amorphous alloy film containing Au was suppressed to a thickness of about 70 Å. The comparative example amorphous alloy film was very oxidizable even after annealing in the Ar gas stream and was oxidized with a very small amount of oxygen contained in the atmosphere to increase Hc as shown in Table 1, whereas in the present amorphous alloy film containing Au, the oxidation was suppressed, and thus the Hc increase was suppressed.

EXAMPLE 2

Figure 2:
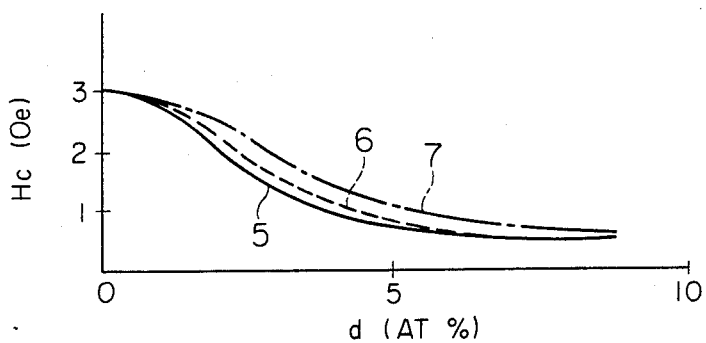
FIG. 2 is a diagram showing Hc after annealing of amorphous alloy films containing Au, Pt and Ag.

Amorphous alloy films having a thickness of 0.2 μm and compositions $Co_{86-d}Nb_6Zr_8Au_d$, $Co_{86-d}Nb_6Zr_8Ag_d$, and $Co_{86-d}Nb_6Zr_8Pt_d$, respectively, were prepared in the same manner as in Example 1, and changes in the coercive force of the films after annealing in an Ar gas stream at 350° C. for 2 hours by an amount of d were determined and shown in FIG. 2, where curves 5, 6 and 7 show Hc when Au, Pt and Ag were contained in the alloys, respectively. As shown in FIG. 2, any of Au, Pt and Ag was effective for suppressing an Hc increase after the annealing, and it can be seen from the results that the effect is remarkable by addition of at least about 1% by atom of Au, Pt or Ag, and more remarkable by at least about 3% by atom.

The conventional Zr-containing amorphous alloy underwent surface oxidation even at a relatively low annealing temperature such as about 150° C., deteriorating the characteristics. Even in such cases, the deterioration of magnetic characteristics could be effectively suppressed by addition of the nobel metal according to the present invention.

EXAMPLE 3

Figure 3:
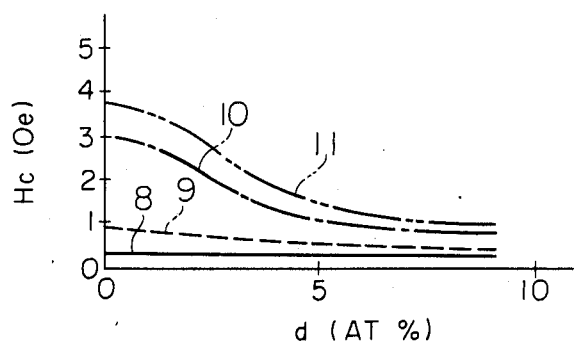
FIG. 3 is a diagram showing changes in Hc before and after annealing amorphous alloy films containing Au.

An amorphous alloy film having a thickness of 1.5 μm and a composition $Co_{86-d}Nb_6Zr_8Au_d$ was formed on a glass substrate #7059, and a $SiO_2$ film having a thickness of 1μm was further formed on the amorphous alloy film by means of an rf diode sputtering apparatus in the same manner as in Example 1. These films were annealed at 400° C. for 30 minutes to compare Hc before the annealing with that after the annealing. Furthermore, Hc of the surface layers of amorphous alloy film in contact with the glass substrate and the $SiO_2$ layer was determined by Kerr effect, and the results are shown in FIG. 3, where curve 8 shows Hc of the entire film before the annealing, curve 9 Hc of the entire film after the annealing, curve 10 Hc of the surface layer of amorphous alloy film in contact with the $SiO_2$ film after the annealing, 11 Hc of the surface layer of amorphous alloy film in contact with the glass substrate after the annealing. As shown in FIG. 3, Hc of the entire film was not largely deteriorated, because the film thickness was relatively large, for example, about 1.5 μm, but Hc of the surface layers of amorphous alloy film in contact with the glass substrate and the $SiO_2$ layer was considerably increased after the annealing, and it is obvious therefrom that the deterioration could be suppressed by the addition of Au.

EXAMPLE 4

Figure 4:
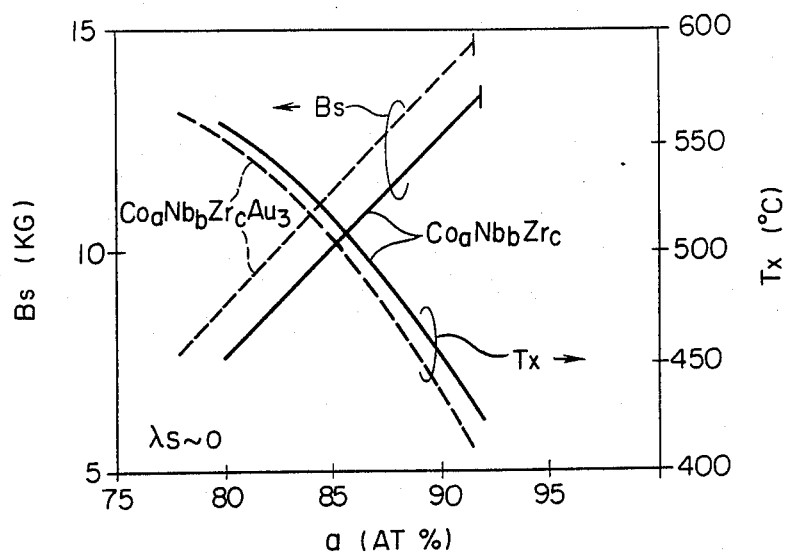
FIG. 4 is a diagram showing Bs and Tx in amorphous alloys containing Au.

Amorphous alloy films having a thickness of 1 μm and compositions $Co_aNb_bZr_c$ and $Co_aNb_bZr_cAu_d$ (% by atom), respectively, were prepared according to the same manner as in Example 1. The compositions were so adjusted that the CoNbZr-based amorphous alloy film could satisfy the relationship of $3c-b\simeq0$, and the CoNbZrAu-based one could satisfy the relationship of $3c-b-4d\simeq0$, and the saturation flux density Bs, crystallization temperature Tx and magnetostriction constant λs were determined for the films whose a was changed. The results are shown in FIG. 4. It is obvious therefrom that when a, i.e., the Co concentration, was changed, Bs increased with a, whereas Tx decreased with a. When b, c and d satisfied the relationship, λs was in a range of $\pm 0.3 \times 10^{-6}$, that is, substantially zero. In a CoNbZr-based amorphous alloy film containing 4% by atom of Au, Bs increased by about 1.5 KG and Tx decreased by about 10° C. at the same Co concentration, as shown in FIG. 4. Thus, when the Co concentration was changed to obtain substantially same Tx, the amorphous alloy film containing Au could obviously have an increased Bs by about 1 KG, as compared with the amorphous alloy film having no Au.

In the CoNbZr system, it was necessary to satisfy the relationship $b+2c\geq 10$ to obtain an amorphous film, and in an amorphous film satisfying the relationship $3c-b=0$ and having substantially zero λs, it was necessary that Co was not more than 92% by atom. Thus, in the CoNbZr system, the maximum Bs of an amorphous film obtainable at the condition of λs~0 was about 13.5 KG, as shown in FIG. 4. Furthermore, in the CoNbZr system, it was necessary that the Co concentration be at least about 80% by atom to obtain Bs of at least 8 KG, as shown in FIG. 4, but in the system containing Au, a higher saturation flux density than about 8 KG could be obtained by making the sum total of Co and Au concentrations higher than 80% by atom.

By adding Au to the CoNbZr system, an amorphous alloy having a substantially zero magnetostriction constant, a high saturation flux density and a high crystallization temperature could be obtained, as described above. It was found that the foregoing effect of adding Au could be likewise obtained even by replacing Nb with Ta, W, Mo, V, Cr or their mixture, or by replacing Au with Pt, Ag or their mixture.

Figure 5:
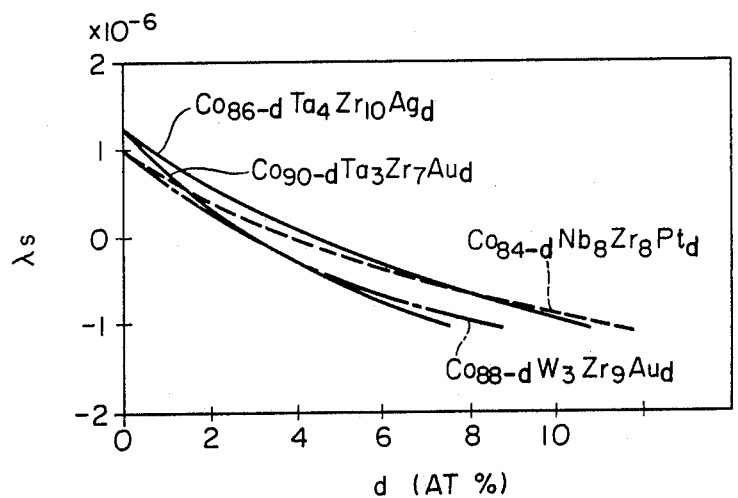
FIG. 5 is a diagram showing changes in λs when Au, Pt and Ag are added to the amorphous alloys.

The magnetostriction constant of these amorphous alloy films depended on the amount of Au, Pt, or Ag to be added. Changes in the magnetostriction constant λs by the amount d of Au, Pt, or Ag to be added to a CoNbZr system, a CoTaZr system and a CoWZr system are shown in FIG. 5. As shown in FIG. 5, λs decreased with increasing amount of Au, Pt or Ag and further increased in a negative value. By adjusting the amount of additional Au, Pt or Ag to an appropriate value, λs could be brought in the necessary range for the magnetic head film, i.e. $\pm 1 \times 10^{-6}$.

From the results of measurements as shown in FIG. 5, it was found necessary that the composition be selected to satisfy the following relationship to keep the magnetostriction constant within a range of $\pm 1 \times 10^{-6}$:

$$-1 \leq (3c - b_1 - 3b_2 - 5b_3 - 3b_4 - 4d)/(c + b_1 + b_2 + b_3 + b_4 d) \leq 1$$

wherein $b_1$ shows a Nb concentration; $b_2$ a Ta concentration; $b_3$ a W concentration; $b_4$ sum total of Mo, Cr and V concentrations; c a Zr concentration; and d sum total of Au, Pt and Ag concentrations. It was preferable for a magnetic film for a magnetic head that λs be in a range of $\pm 0.5 \times 10^{-6}$, and to this end it was necessary that the composition be selected to satisfy the following relationship:

$$-0.5 \leq (3c - b_1 - 3b_2 - 5b_3 - 3b_4 - 4d)/(c + b_1 + b_2 + b_3 + b_4 + d) \leq 0.5$$

To make the present magnetic film amorphous, it was necessary that the following relationship be satisfied:

$$b_1 + 2c \geq 10$$

where c shows a Zr concentration and $b_1$ an Nb concentration, as mentioned above.

Ta had a substantially equal ability to form an amorphous state to that of Nb, and when Ta was contained, an amorphous alloy film could be obtained by satisfying the following relationship:

$$b_1 + b_2 + 2c \geq 10$$

where $b_2$ shows a Ta concentration.

To make the saturation flux density of the present amorphous alloy film higher than 8 KG, it was necessary that the sum total of Co concentration and Au, Pt and Ag concentrations be at least 80% by atom, that is, to satisfy the following relationship:

$$a + d \geq 80$$

EXAMPLE 5

Amorphous alloy films having a thickness of 0.2 μm and compositions shown in Table 2 were prepared in the same manner as in Example 1. Film characteristics are shown in Table 2.

TABLE 2

| Composition (% by atom) | Bs (KG) | Tx (°C.) | λs | HC (Oe) as annealed at 350° C. for 2 hr. |
|---|---|---|---|---|
| $Co_{85}Nb_9Au_{1.5}Zr_{4.5}$ | 11.0 | 510 | $-0.3 \times 10^{-6}$ | 2.4 |
| $Co_{87.5}Nb_3Au_{3.5}Zr_6$ | 12.8 | 470 | $-0.1 \times 10^{-6}$ | 0.8 |
| $Co_{74}Nb_5Au_8Zr_{13}$ | 8.5 | 580 | $+0.2 \times 10^{-6}$ | 0.6 |
| $Co_{87}Nb_6Pt_2Zr_5$ | 12.2 | 465 | $+0.2 \times 10^{-6}$ | 2.3 |
| $Co_{79}Nb_8Pt_5Zr_8$ | 9.0 | 545 | $-0.4 \times 10^{-6}$ | 0.7 |
| $Co_{86}Nb_3Ag_4Zr_7$ | 12.5 | 475 | $-0.1 \times 10^{-6}$ | 1.3 |
| $Co_{80}Nb_{12}Au_2Zr_6$ | 8.6 | 570 | $-0.2 \times 10^{-6}$ | 2.0 |
| $Co_{88}Ta_2Au_4Zr_6$ | 14.7 | 465 | $-0.3 \times 10^{-6}$ | 0.8 |
| $Co_{83}Ta_7Ag_3Zr_7$ | 10.8 | 530 | $-0.7 \times 10^{-6}$ | 1.8 |
| $Co_{88.5}Ta_3Pt_{1.5}Zr_7$ | 13.0 | 480 | $+0.5 \times 10^{-6}$ | 2.4 |
| $Co_{87}W_2Au_3Zr_8$ | 12.5 | 500 | $+0.2 \times 10^{-6}$ | 1.2 |
| $Co_{87}W_4Ag_2Zr_7$ | 11.6 | 480 | $-0.5 \times 10^{-6}$ | 2.1 |
| $Co_{86}Mo_5Au_2Zr_7$ | 11.5 | 490 | $-0.1 \times 10^{-6}$ | 1.9 |
| $Co_{79}Cr_5Pt_4Zr_{12}$ | 8.5 | 600 | $+0.2 \times 10^{-6}$ | 1.0 |
| $Co_{80}V_6Ag_5Zr_9$ | 9.5 | 550 | $-0.6 \times 10^{-6}$ | 0.8 |

In the present amorphous alloy films containing Au, Ag or Pt as shown in Table 2, a high saturation flux density Bs of 8 KG to about 15 KG and λs in a range of $\pm 1 \times 10^{-6}$ could be obtained by selecting composition ratios and a magnetostriction coefficient in a range of $\pm 5 \times 10^{-6}$ which was very near to zero, and a high crystallization temperature could be obtained by further selection of the composition ratios. Even if these films were heated, the surface oxidation could be suppressed by addition of Au, Ag or Pt, and the coercive force after the heating could be controlled to a smaller value than 3 Oe, as compared with the films containing no such Au, Ag or Pt.

EXAMPLE 6

Figure 6A:
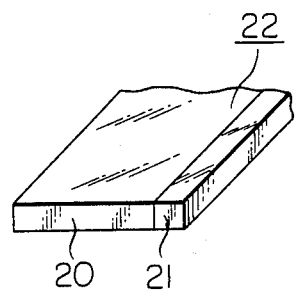
FIGS. 6A to 6E are perspective views showing a process for preparing a magnetic head according to one embodiment of the present invention.
Figure 6B:
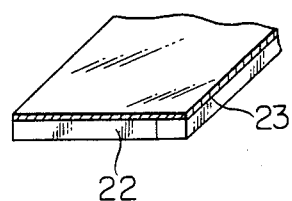
Figure 6C:
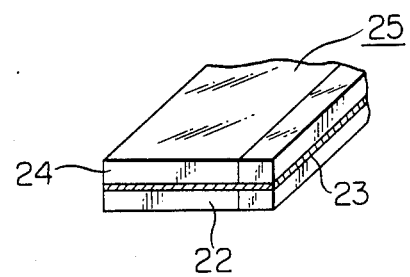
Figure 6D:
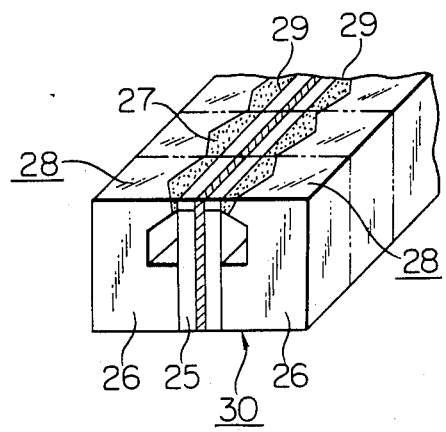
Figure 6E:
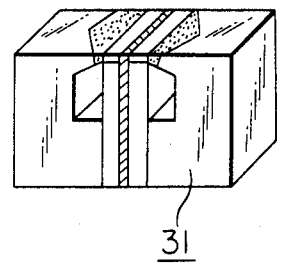

A single pole type head for perpendicular magnetic head shown in FIG. 6E was prepared, using an amorphous alloy film having a composition of $Co_{88}Ta_2Au_4Zr_6$.

On the surface of substrate 22 composed of a Mn-Zn ferrite 20 and a high melting point glass 21 as shown in FIG. 6A was formed an amorphous alloy film 23 having a thickness of 0.2 μm and the composition of $Co_{88}Ta_2Au_4Zr_6$ by means of an rf diode sputtering apparatus, as shown in FIG. 6B. Furthermore, a Pb-based glass film for bonding was formed thereon by sputtering, and a similar substrate 24 to that shown in FIG. 6A was placed thereon, as shown in FIG. 6C and heated at 400° C. for 15 minutes to fix the Pb-based glass through melting, whereby a main magnetic pole block 25 was prepared.

Auxiliary core blocks 28 each composed of a Mn-Zn ferrite 26 and a high melting point glass 27 were provided with a similar Pb-based glass film as above on the bonding surfaces 29 and joined together through the main magnetic pole block 25 and heated at 400° C. for 15 minutes to prepare a bonded block 30 through melt fixation by the Pb-based glass, as shown in FIG. 6D. Then, by cutting the bonded block 30 along the alternate long and two short dashes line shown in FIG. 6D, a single pole type head for perpendicular magnetic head as shown in FIG. 6E was obtained.

A similar magnetic head as shown in FIG. 6E was prepared, using an amorphous alloy film having a composition of $Co_{91}Ta_5Zr_4$ and a substantially equal saturation flux density to that of the present amorphous alloy film of $Co_{88}Ta_2Au_4Zr_6$. The thus prepared magnetic heads were subjected to determination of recording and reproducing characteristics, using a Co-Cr perpendicular recording medium. As a result, it was found that the present magnetic head using the Au-containing amorphous alloy film as the main magnetic pole film had a higher output by about 3dB than that of the magnetic head using the amorphous alloy film containing no Au.

It is obvious from the foregoing example that distinguished magnetic head characteristics can be obtained by using an amorphous alloy film containing the noble metal without any oxidation of the amorphous alloy film in contact with glass, or oxides such Mn-Zn ferrite, etc. in the heating step in the process for preparing the magnetic head, that is, without any deterioration of magnetic characteristics.

EXAMPLE 7

Figure 7A:
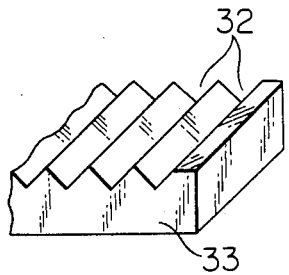
FIGS. 7A to 7F are perspective views showing a process for preparing a magnetic head according to another embodiment of the present invention.
Figure 7B:
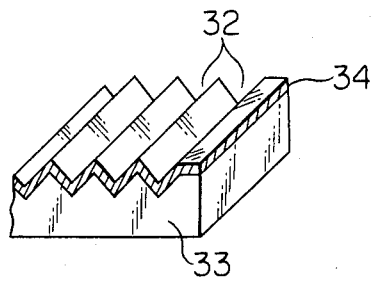
Figure 7C:
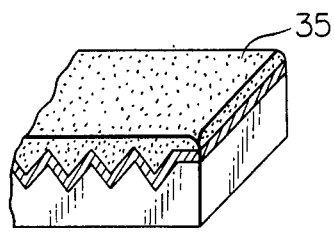
Figure 7D:
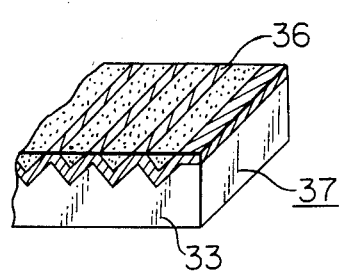
Figure 7E:
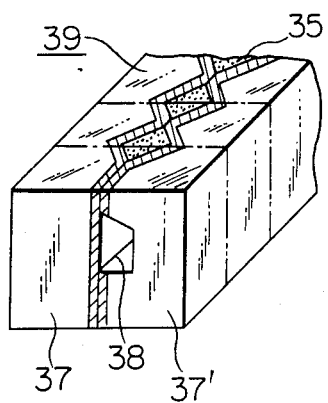
Figure 7F:
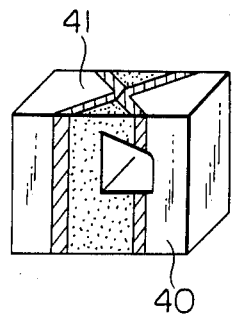

A VTR magnetic head as shown in FIG. 7F was prepared, using an amorphous alloy film having a composition of $Co_{82}Nb_6Pt_4Zr_8$. On a substrate 33 composed of Mn-Zn ferrite with grooves 32 as shown in FIG. 7A was formed an amorphous alloy film 34 having a thickness of about 10 μm and the composition of $Co_{82}Nb_6Pt_4Zr_8$ by means of an rf diode sputtering apparatus, as shown in FIG. 7B. A Pb-based low melting point glass 35 was filled in the grooves 32 by heating at 460° C. for 15 minutes, as shown in FIG. 7C, and the substrate surface was ground and polished to form a gap-forming surface 36, as shown in FIG. 7D, whereby a head core semi-block 37 was prepared. Then, a $SiO_2$ film as a gap material was formed on the gap-forming surface 36 by sputtering, and a head core semi-block 37' having a coil hole 38 and the said head core block 37 were joined together through the gap material by heating at 460° C. for 15 minutes to remelt the low melting point Pb-based glass 35 and by the successive solidification, whereby a bonded block 39 was prepared, as shown in FIG. 7E. Then by cutting the bonded block 39 along the long and two short dashes line in FIG. 7E, a magnetic head 40 was prepared as shown in FIG. 7F.

Figure 8:
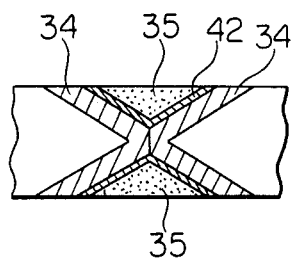
FIG. 8 is a plan view showing one embodiment of a magnetic head using an amorphous alloy film according to the present invention.
Figure 9:
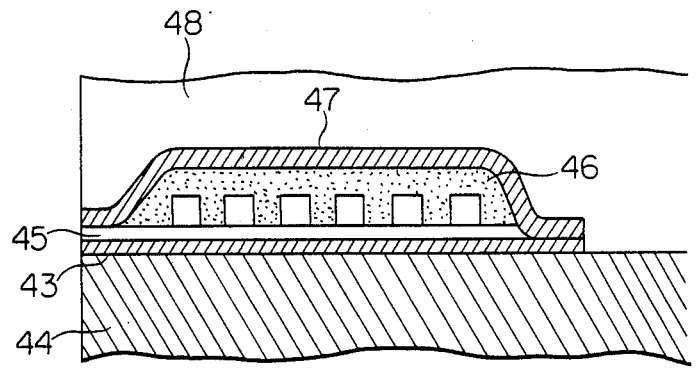
FIG. 9 is a cross-sectional view showing another embodiment of a magnetic head using an amorphous alloy film according to the present invention.

A similar magnetic head as shown in FIG. 7F was prepared, using an amorphous alloy film having a composition of $Co_{84}Nb_{13}Zr_3$ having a substantially equal saturation flux density to that of $Co_{82}Nb_6Pt_4Zr_8$ as used in this example. It was found by observing the tape sliding surface 41 of these magnetic heads that a reaction layer of the amorphous alloy film with the glass existed between the amorphous alloy film 34 and the low melting point Pb-based glass 35 as shown in FIG. 8 and the effective track width was reduced.

The thickness of the reaction layer was about 2 μm in the case of the amorphous alloy film of $Co_{84}Nb_{13}Zr_3$, but less than 1 μm in the case of the present amorphous alloy film containing the noble metal. As a result of measuring the recording and reproducing characteristics of these magnetic heads by a metal tape having an coercive force of 1,400 Oe, the present magnetic head using the amorphous alloy film containing the noble metal had a higher output of about 2.5 dB at frequencies of 1 to 6 MHz than that of the magnetic head using the amorphous alloy film containing no such noble metal.

It is obvious from the foregoing example that a magnetic head having distinguished characteristics can be obtained by using an amorphous alloy film containing the noble metal, thereby suppressing formation of a reaction layer with glass, oxides, etc. in the heating step in the process for preparing a magnetic head, and preventing reduction in the effective track width and deterioration of magnetic characteristics.

The present invention is not only restricted to the magnetic heads disclosed in the foregoing examples, but can be effectively applied also to magnetic heads to be prepared at least through the heating step, where a magnetic film to be used in the magnetic circuit or the magnetic shield is exposed to the atmosphere or is in contact with oxides such as ferrite, ceramics, glass, etc., or with an oxygen-containing organic material. For example, in a thin film magnetic head for use in computer disk devices, etc., a lower magnetic film 43 is sandwiched between a substrate 44 composed of ceramics and a gap-controlling material 45 of $SiO_2$ or $Al_2O_3$, and is subjected to heating, for example, at 350° C. for 10 hours, in a process for forming and curing a filling material such as polyimide resin, etc. thereon. Furthermore, an upper magnetic film 47 is sandwiched between the filling material 46 such as polyimide resin and a protective material 48 such as $Al_2O_3$, etc. and is subjected to heating at 300° C. or higher when the protective material is to be formed by sputtering.

As described above, though a magnetic film to be used in the magnetic circuit even in a thin film magnetic head must be subjected to a heating process while being in contact with oxygen-containing ceramics, glass, resin, etc., it can be given distinguished characteristics by using an amorphous alloy containing Au, Pt or Ag according to the present invention.

A shield film in a magnetoresistive head is likewise subjected to a heating step in contact with an oxide, as in the case of the said thin film head, and thus a magnetoresistive head having distinguished characteristics can be obtained by using the present amorphous alloy containing Au, Pt or Ag in the shield film.

As described above, the present amorphous alloy film containing Au, Pt or Ag has distinguished characteristics such as a high saturation flux density, a high crystallization temperature and a substantially zero magnetostriction constant and hardly undergoes oxidation reaction even if subjected to a heating step in an oxidesandwiched state, resulting in less deterioration of the magnetic characteristics. Thus, a magnetic head using the present amorphous alloy film can obviously have distinguished magnetic head characteristics.

What is claimed is:

1. A magnetic head comprising a magnetic circuit, at least a part of said magnetic circuit including a magnetic film, wherein said magnetic film is composed of an amorphous alloy film having the following composition formula:

$Co_aT_bZr_cN_d$ wherein T is at least one of Nb, Ta, W, Mo, V, and Cr; N is at least one of Au, Pt and Ag; $d \geq 1$, $b > 0$, $b_1+b_2+2c \geq 10$, $a+d \geq 80$, $-1 \leq (3c-b_1-3b_2-5b_3-3b_4-4d)/(c+b_1+b_2+b_3+b_4+d) \leq 1$, and $a+b+c+d=100$, where $b_1$ is a Nb concentration, $b_2$ is a Ta concentration, $b_3$ is a W concentration, $b_4$ is sum total of Mo, Cr and V concentrations, and $b=b_1+b_2+b_3+b_4$.

2. A magnetic head according to claim 1, wherein said magnetic film is formed in contact with an oxide layer and is subjected to a heating step at an elevated temperature of at least 150° C.

3. A magnetic head according to claim 1, wherein said magnetic film is in contact with an oxygen-containing layer and is subjected to a heating step at an elevated temperature of at least 150° C.

4. A magnetic head according to claim 1, wherein said magnetic film is exposed to oxygen while being subjected to a heating step at an elevated temperature of at least 150° C.

5. A magnetic head according to claim 1, wherein the magnetic film is composed of an amorphous alloy film having the following composition formula:

$Co_aT_bZr_cN_d$ wherein T is at least one of Nb, Ta, W, Mo, V and Cr; N is at least one of au, Pt and ag; $d \geq 3$, $b > 0$, $b_1+b_2+2c \geq 10$, $a+d \geq 80$,
$-1 \leq (3c-b_1-3b_2-5b_3-3b_4-4d)/(c+b_1+b_2+b_3+b_4+d) \leq 1$, and $a+b+c+d=100$, wherein $b_1$ is a Nb concentration, $b_2$ is a Ta concentration, $b_3$ is a W concentration, $b_4$ is sum total of Mo, Cr and V concentrations and $b=b_1+b_2+b_3+b_4$.

6. A magnetic head according to claim 5, wherein the magnetic film is composed of an amorphous alloy film having the following composiiton formula:

$Co_aT_bZr_cN_d$ 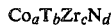

wherein T is at least one of Nb, Ta, W, Mo, V and Cr; N is at least one of Au, Pt and Ag; $d \geq 3$, $b>0$, $b_1+b_2+2c \geq 10$, $a+d \geq 80$, $-0.5 \leq (3c-b_1-3b_2-5b_3-3b_4-4d)/(c+b_1+b_2+b_3+b_4+d) \leq 0.5$, and $a+b+c+d=100$, where $b_1$ is a Nb concentration, $b_2$ is a Ta concentration, $b_3$ is a W concentration, $b_4$ is sum total of Mo, Cr and V concentrations and $b=b_1+b_2+b_3+b_4$.

7. A magnetic head comprising a magnetic shield, at least a part of said magnetic shield including a magnetic film, wherein said magnetic film is composed of an amorphous alloy film having the following composition formula:

$Co_aT_bZr_cN_d$ 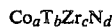

wherein T is at least one of Nb, Ta, W, Mo, V, and Cr; N is at least one of Au, Pt and Ag; $d \geq 1$, $b>0$, $b_1+b_2+2c \geq 10$, $a+d \geq 80$, $-1 \leq (3c-b_1-3b_2-5b_3-3b_4-4d)/(c+b_1+b_2+b_3+b_4+d) \leq 1$, and $a+b+c+d=100$, where $b_1$ is a Nb concentration, $b_2$ is a Ta concentration, $b_3$ is a W concentration, $b_4$ is sum total of Mo, Cr and V concentrations, and $b=b_1+b_2+b_3+b_4$.

8. A magnetic head according to claim 7, wherein said magnetic film is formed in contact with an oxide layer and is subjected to a heating step at an elevated temperature of at least 150° C.

9. A magnetic head according to claim 7, wherein said magnetic film is in contact with an oxygen-containing layer and is subjected to a heating step at an elevated temperature of at least 150° C.

10. A magnetic head according to claim 7, wherein said magnetic film is exposed to oxygen while being subjected to a heating step at an elevated temperature of at least 150° C.

11. A magnetic head according to claim 7, wherein said magnetic head is a magnetoresistive head.

12. A magnetic head according to claim 7, wherein the magnetic film is composed of an amorphous alloy film having the following composition formula:

$Co_aT_bZr_cN_d$ 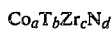

wherein T is at least one of Nb, Ta, W, Mo, V, and Cr; N is at least one of Au, Pt and Ag; $d \geq 3$, $b>0$, $b_1+b_2+2c \geq 10$, $a+d \geq 80$, $-1 \leq (3c-b_1-3b_2-5b_3-3b_4-4d)/(c+b_1+b_2+b_3+b_4+d) \leq 1$, and $a+b+c+d=100$, where $b_1$ is a Nb concentration, $b_2$ is a Ta concentration, $b_3$ is a W concentration, $b_4$ is sum total of Mo, Cr and V concentrations, and $b=b_1+b_2+b_3+b_4$.

13. A magnetic head according to claim 12, wherein the magnetic film is composed of an amorphous alloy film having the following composition formula:

$Co_aT_bZr_cN_d$ 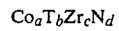

wherein T is at least one of Nb, Ta, W, Mo, V, and Cr; N is at least one of Au, Pt and Ag; $d \geq 3$, $b>0$, $b_1+b_2+2c \geq 10$, $a+d \geq 80$, $-0.5 \leq (3c-b_1-3b_2-5b_3-3b_4-4d)/(c+b_1+b_2+b_3+b_4+d) \leq 0.5$, and $a+b+c+d=100$, where $b_1$ is a Nb concentration, $b_2$ is a Ta concentration, $b_3$ is a W concentration, $b_4$ is sum total of Mo, Cr and V concentrations, and $b=b_1+b_2+b_3+b_4$.

14. A magnetic shield for a magnetoresistive head comprising a shield film formed of an amorphous alloy having the following composition formula:

$Co_aT_bZr_cN_d$ 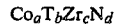

wherein T is at least one of Nb, Ta, W, Mo, V, and Cr; N is at least one of Au, Pt and Ag; $d \geq 1$, $b>0$, $b_1+b_2+2c \geq 10$, $a+d \geq 80$, $-1 \leq (3c-b_1-3b_2-5b_3-3b_4-4d)/(c+b_1+b_2+b_3+b_4+d) \leq 1$, and $a+b+c+d=100$, where $b_1$ is a Nb concentration, $b_2$ is a Ta concentration, $b_3$ is a W concentration, $b_4$ is sum total of Mo, Cr and V concentrations, and $b=b_1+b_2+b_3+b_4$.

15. A magnetic shield according to claim 14, wherein said shield film is formed in contact with an oxide layer and is subjected to a heating step at an elevated temperature of at least least 150° C.

16. A magnetic shield according to claim 14, wherein said shield film is in contact with an oxygen-containing layer and is subjected to a heating step at an elevated temperature of at least 150° C.

17. A magnetic shield according to claim 14, wherein said sheild film is exposed to oxygen while being subjected to a heating step at an elevated temperature of at least 150° C.

18. A magnetic shield according to claim 14, wherein the shield film is composed of an amorphous alloy film having the following composition formula:

$Co_aT_bZr_cN_d$ 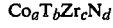

wherein T is at least one of Nb, Ta, W, Mo, V, and Cr; N is at least one of Au, Pt and Ag; $d \geq 3$, $b>0$, $b_1+b_2+2c \geq 10$, $a+d \geq 80$, $-1 \leq (3c-b_1-3b_2-5b_3-3b_4-4d)/(c+b_1+b_2+b_3+b_4+d) \leq 1$, and $a+b+c+d=100$, where $b_1$ is a Nb concentration, $b_2$ is a Ta concentration, $b_3$ is a W concentration, $b_4$ is sum total of Mo, Cr and V concentrations, and $b=b_1+b_2+b_3+b_4$.

19. A magnetic shield according to claim 18, wherein the shield film is composed of an amorphous alloy film having the following composition formula:

$Co_aT_bZr_cN_d$ 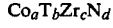

wherein T is at least one of Nb, Ta, W, Mo, V, and Cr; N is at least one of Au, Pt and Ag; $d \geq 3$, $b>0$, $b_1+b_2+2c \geq 10$, $a+d \geq 80$, $-0.5 \leq (3c-b_1-3b_2-5b_3-3b_4-4d)/(c+b_1+b_2+b_3+b_4+d) \leq 0.5$, and $a+b+c+d=100$, where $b_1$ is a Nb concentration, $b_2$ is a Ta concentration, $b_3$ is a W concentration, $b_4$ is sum total of Mo, Cr and V concentrations, and $b=b_1+b_2+b_3+b_4$.

* * * * *